United States Patent
Kim et al.

(10) Patent No.: US 12,553,745 B2
(45) Date of Patent: Feb. 17, 2026

(54) ENERGY BIG DATA SYSTEM AND OPERATION MANAGEMENT METHOD WITH METER ENVIRONMENT INFORMATION

(71) Applicant: Korea Electronics Technology Institute, Seongnam-si (KR)

(72) Inventors: Seong Seop Kim, Yongin-si (KR); Young Min Kwon, Seongnam-si (KR); Seung Woo Lee, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 346 days.

(21) Appl. No.: 18/028,737

(22) PCT Filed: Mar. 31, 2022

(86) PCT No.: PCT/KR2022/004577
§ 371 (c)(1),
(2) Date: Mar. 27, 2023

(87) PCT Pub. No.: WO2023/128063
PCT Pub. Date: Jul. 6, 2023

(65) Prior Publication Data
US 2024/0361151 A1 Oct. 31, 2024

(30) Foreign Application Priority Data

Dec. 31, 2021 (KR) .......... 10-2021-0194201

(51) Int. Cl.
*G01D 4/00* (2006.01)
*G01R 31/367* (2019.01)
*G01R 31/371* (2019.01)

(52) U.S. Cl.
CPC .......... *G01D 4/004* (2013.01); *G01R 31/367* (2019.01); *G01R 31/371* (2019.01)

(58) Field of Classification Search
CPC .... G01D 4/004; G01R 31/367; G01R 31/371; G01F 25/00; G06Q 10/04; G06Q 10/06; G06Q 50/06; G06Q 50/10; G08C 17/02
See application file for complete search history.

(56) References Cited

U.S. PATENT DOCUMENTS

| | | | |
|---|---|---|---|
| 2017/0016943 A1* | 1/2017 | Martin | G01R 31/2849 |
| 2018/0372802 A1* | 12/2018 | Petrucelli | G01K 13/00 |
| 2022/0333741 A1* | 10/2022 | Buettner | F17C 13/04 |

FOREIGN PATENT DOCUMENTS

| | | | | |
|---|---|---|---|---|
| JP | 2017161375 A | * | 9/2017 | G01D 4/004 |
| JP | 2019180066 A | * | 10/2019 | |

(Continued)

OTHER PUBLICATIONS

Communication from Korea Patent Office mailed on Aug. 22, 2022 of Korean Patent Application No. 10-2021-0194201, which corresponds to this patent application.

*Primary Examiner* — Amine Benlagsir
(74) *Attorney, Agent, or Firm* — Harvest IP LAW LLP

(57) ABSTRACT

Provided are an energy big data system and an operation management method associated with meter environment information. A method for managing meters according to an embodiment includes: collecting energy usage data from the meters; collecting environmental data of the meters; and predicting states of the meters, based on the collected environmental data. Accordingly, states of meters may be predicted based on collected environmental information and meter reading information of the meters, so that the meters may be efficiently operated and managed, and a new energy service may be provided through analysis of big data including meter reading information and meter installation environment information.

7 Claims, 4 Drawing Sheets

(56) References Cited

FOREIGN PATENT DOCUMENTS

| KR | 10-2017-0086745 A | | 7/2017 | | |
|---|---|---|---|---|---|
| KR | 2017086745 A | * | 7/2017 | ......... | G01R 19/0092 |

* cited by examiner

ENERGY BIG DATA SYSTEM AND OPERATION MANAGEMENT METHOD WITH METER ENVIRONMENT INFORMATION

CROSS-REFERENCE TO RELATED APPLICATIONS

This application claims the benefit under 35 U.S.C. section 371, of PCT International Application No. PCT/KR2022/004577, filed on Mar. 31, 2022, which claims priority to Korean Patent Application No. 10-2021-0194201, filed on Dec. 31, 2021, in the Korean Intellectual Property Office, both of which are hereby incorporated by reference in their entireties.

TECHNICAL FIELD

The disclosure relates to an advanced metering infrastructure (AMI) application technology, and more particularly, to an energy big data system associated with AMI meter environment information, and a method for analyzing big data and managing operations using the same.

BACKGROUND ART

A related-art gas energy meter reading system may collect only installation information and meter reading information of a meter, that is, only gas energy usage data. The collected gas energy usage data may be utilized as big data and may be utilized for analyzing an energy consumption pattern or predicting an energy demand.

However, only gas energy usage is utilized as data, and accordingly, the scope of analysis is limited. Therefore, there may be a problem that services provided through analysis are limited.

Accordingly, there is a need for a method for analyzing richer and more diverse energy big data.

DISCLOSURE

Technical Problem

The disclosure has been developed in order to address the above-discussed deficiencies of the prior art, and an object of the disclosure is to establish a big data system which includes not only meter reading information of a meter in a gas energy big data system structure but also information on installation and environment of the meter, and to provide a method for providing a new energy service through analysis of big data including environmental information with estimation of states of meters and smooth operation management.

Technical Solution

According to an embodiment of the disclosure to achieve the above-described object, there is provided a method for managing meters, the method including: collecting energy usage data from the meters; collecting environmental data of the meters; and predicting states of the meters, based on the collected environmental data.

The energy usage data and the environmental data may be collected all together through a single meter data packet.

The environmental data may include information regarding a number of communication attempts to transmit the energy usage data, and predicting may include predicting battery states of the meters.

Predicting may include: identifying a hard-to-read region, based on the collected number of communication attempts; and predicting that a battery available time of meters located in the hard-to-read region is shorter than a battery available time of meters located in the other regions.

The method may further include analyzing a cause of difficulty in reading meters in the hard-to-read region.

The environmental data may include a temperature, and predicting may include predicting battery states of the meters.

Predicting may include: identifying a low-temperature region, based on the collected temperatures; and predicting that a battery available time of meters located in the low-temperature region is shorter than a battery available time of meters located in the other regions.

The method may further include controlling a meter reading interval and a communication interval of a meter, based on the temperature.

The environmental data may include an installation position and a height of each of the meters, and a number of communication attempts, and the method may further include analyzing a communication environment depending on a height by regions.

According to another embodiment, there is provided a system for managing meters, the system including: a data platform configured to collect energy usage data from the meters, and to collect environmental data of the meters; and an analysis system configured to predict states of the meters, based on the environmental data collected in the data platform.

According to another embodiment, there is provided a method for managing meters, the method including: collecting energy usage data from the meters; collecting environmental data of the meters; predicting states of the meters, based on the collected environmental data; and controlling the meters based on the predicted states of the meters.

According to another embodiment, there is provided a system for managing meters, the system including: a data platform configured to collect energy usage data from the meters, and to collect environmental data of the meters; and an analysis system configured to predict states of the meters, based on the environmental data collected in the data platform, and to control the meters based on the predicted states of the meters.

Advantageous Effects

According to embodiments of the disclosure as described above, states of meters may be predicted based on collected environmental information and meter reading information of the meters, so that the meters may be efficiently operated and managed, and a new energy service may be provided through analysis of big data including meter reading information and meter installation environment information.

BEST MODE

Hereinafter, the disclosure will be described in more detail with reference to the drawings.

Embodiments of the disclosure provide an energy big data system and an operation management method associated with meter environment information. The disclosure provides a method of predicting states of meters by analyzing meter environment information, and effectively operating the meters by controlling the meters based on the predicted states.

Figure 1:
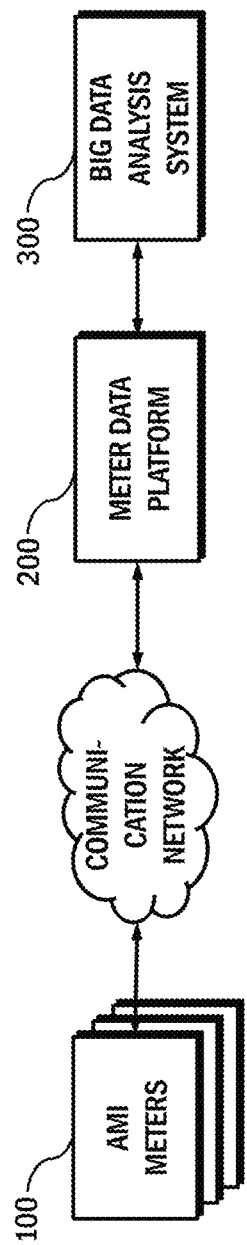
FIG. 1 is a view illustrating an AMI system to which an embodiment of the disclosure is applicable.

FIG. 1 is a view illustrating an AMI system to which an embodiment of the disclosure is applicable. The AMI system to which the embodiment of the disclosure is applicable may include AMI meters 100, a meter data platform 200, and a big data analysis system 300 as shown in FIG. 1.

The AMI meters 100 generate meter data packets and periodically transmit the meter data packets to the meter data platform 200 through a communication network. Meter data may include energy usage data which is generated by reading meters, and environmental data.

The environmental data may include data regarding a position, a height of the AMI meter 100, temperature, atmospheric pressure, the number of communication attempts. The position and height may be a position and a height of the AMI meter 100 installed, the temperature and atmospheric pressure may be temperature and atmospheric pressure of a region where the AMI meter 100 is installed, and the number of communication attempts may refer to the number of times the AMI meter 100 attempts to communicate to successfully transmit meter data.

The meter data platform 200 may accumulate and store/retain meter data received from the AMI meters 100.

The big data analysis system 300 may predict states of the AMI meters 100 by analyzing meter data stored in the meter data platform 200, and may control the AMI meters 100 based on the predicted states.

In addition, the big data analysis system 300 may provide other services based on a result of analyzing the meter data stored in the meter data platform 200.

Figure 2:
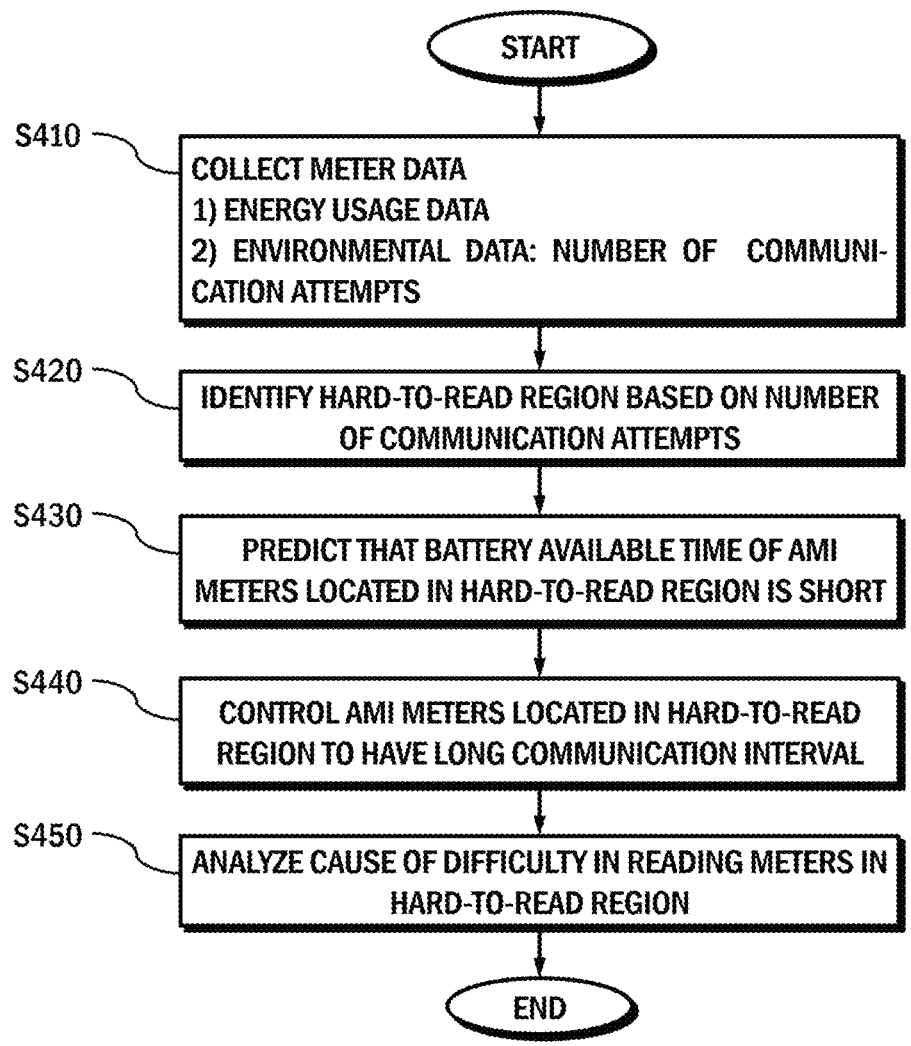
FIG. 2 is a flowchart provided to explain a method for managing an AMI meter based on meter data analysis according to an embodiment of the disclosure.

FIG. 2 is a flowchart provided to explain a method for managing an AMI meter based on meter data analysis according to another embodiment of the disclosure.

As shown in FIG. 2, the meter data platform 200 collects meter data from the AMI meters 100 (S410). The collected meter data may include energy usage data and meter environment data. In addition, the meter environment data may include the number of communication attempts.

Figure 3:
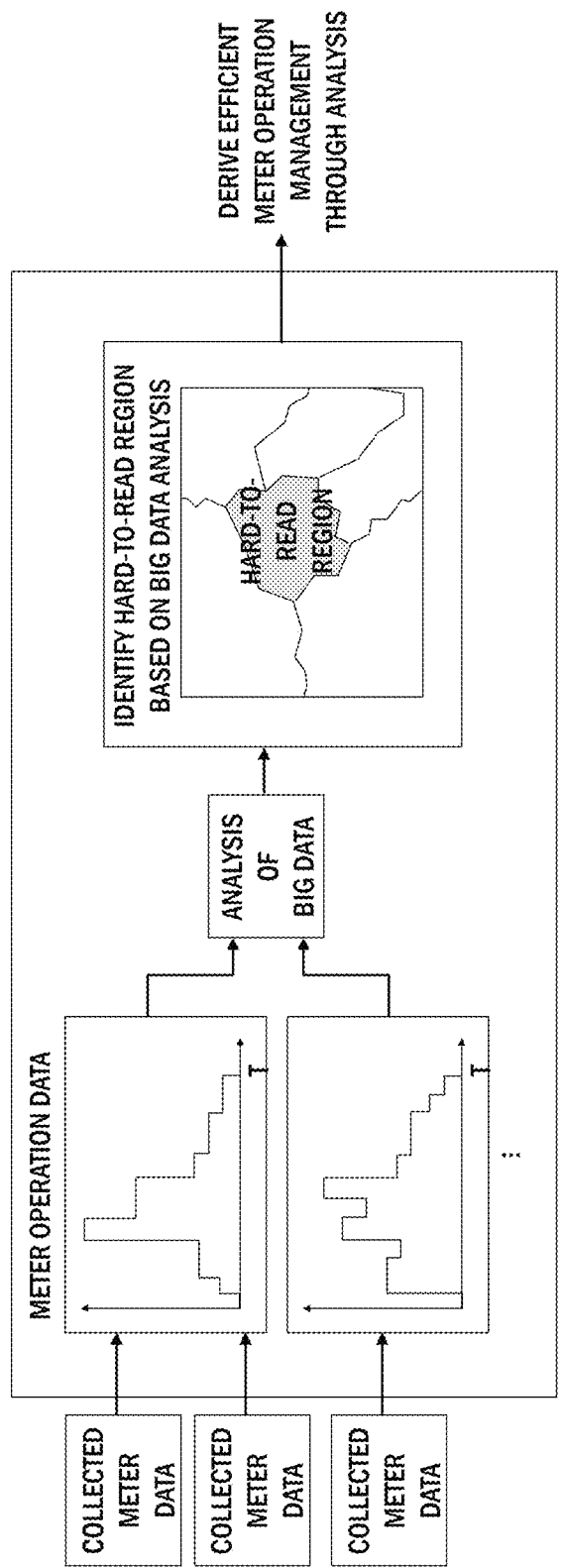
FIG. 3 is a view illustrating a result of identifying a hard-to-read region based on the number of communication attempts.

The big data analysis system 300 may identify a hard-to-read region based on the number of communication attempts included in the meter data, which is collected at step S410 (S420). The hard-to-read region may refer to a region where there are a large number of communication attempts since the AMI meters 100 attempt to transmit meter data but fail to transmit many times. FIG. 3 illustrates a result of identifying a hard-to-read region based on the number of communication attempts.

The big data analysis system 300 may predict that a battery available time of AMI meters 100 located in the hard-to-read region is shorter than a battery available time of meters located in the other regions (S430).

This is because the AMI meters 100 located in the hard-to-read region consume more electric currents than the AMI meters located in the other regions. The result of predicting may be provided to an operator terminal.

The big data analysis system 300 may control the AMI meters 100 located in the hard-to-read region to have a long communication interval (S440). This is to reduce battery consumption of the AMI meters 100 located in the hard-to-read region and to increase a remaining battery lifespan.

Furthermore, the big data analysis system 300 may analyze a cause of difficulty in reading meters in the hard-to-read region, based on the meter data collected at step S410 (S450). Specifically, the big data analysis system 300 may analyze whether the difficulty in reading meters is caused by communication competition/collision by concentration of the AMI meters 100, or a problem in a communication network.

To achieve this, the big data analysis system 300 may further obtain location data included in the environmental data of the AMI meters 100, and may collect data regarding a distribution of base stations of the communication network and communication data of the respective base stations through other routes, and may refer thereto.

Figure 4:
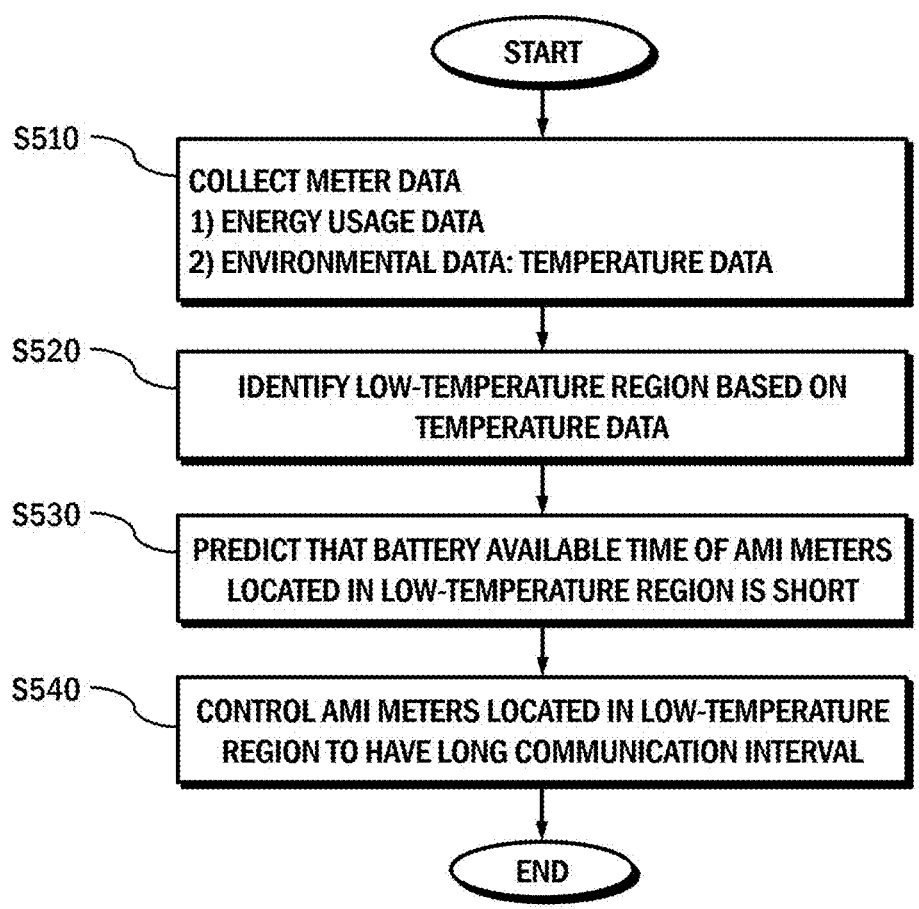
FIG. 4 is a flowchart provided to explain a method for managing an AMI meter based on AMI data analysis according to another embodiment of the disclosure.

FIG. 4 is a flowchart provided to explain a method for managing an AMI meter based on AMI data analysis according to another embodiment of the disclosure.

As shown in FIG. 4, the meter data platform 200 collects meter data from the AMI meters 100 (S510). The collected meter data may include energy usage data and meter environment data. In addition, the meter environment data may include temperature data.

The big data analysis system 300 may identify a low-temperature region based on the temperature data included in the meter data collected at step S510 (S520). The low-temperature region refers to a region in which an average of temperature data collected in the AMI meters 100 is lower than that of the other regions by a predetermined level.

The big data analysis system 300 may predict that a battery available time of the AMI meters 100 located in the low-temperature region is shorter than a battery available time of meters located in the other regions (S530). This reflects that the lifespan of a battery in a low-temperature environment is reduced. The result of predicting may be provided to an operator terminal.

The big data analysis system 300 may control the AMI meters 100 located in the low-temperature region to have a long communication interval (S540). This is to reduce battery consumption of the AMI meters 100 located in the low-temperature region and to increase a remaining battery lifespan.

The big data analysis system 300 may adjust a meter reading/communication interval of the AMI meters based on the temperature data. In other words, the big data analysis system 300 may reduce a meter reading/communication interval in a high-temperature or low-temperature environment in which much energy is consumed.

This adjustment may be applied to a low-temperature region and the other regions, and the adjustment may be made from a default meter reading/communication frequency. Therefore, it should be noted that this does not conflict with the embodiment of FIG. 4 in which a default communication interval is differently set.

Up to now, the energy big data system and the operation management method with meter environment information have been described in detail with reference to preferred embodiments.

Other analysis may be possible besides the analysis mentioned in the above-described embodiments. That is, the big data analysis system 300 may analyze a correlation regarding a height and the number of communication attempts, which are included in environmental data, according to a region, and may analyze a communication environment depending on a height (altitude) in each region.

In the above-described embodiments, it is assumed that the gas energy usage data and the environmental data are transmitted altogether through one packet, but changes may be made thereto. In other words, the two types of data may be separately transmitted.

Furthermore, the both types of data may be transmitted as one piece of meter data, but the data that needs to be transmitted frequently may be additionally transmitted between meter data transmission periods.

In addition, in an embodiment of the disclosure, there is no limit to types of energy that are metered through an AMI. The technical concept of the disclosure may be applied to other energy usage meter reading systems including a gas AMI, an electricity AMI a water AMI.

An embodiment of the disclosure provides a big data system structure which includes not only meter reading information of a meter but also installation and environment information of the meter, and an operation management system using the same.

Accordingly, states of meters may be predicted based on collected environmental information and meter reading information of the meters, so that the meters may be efficiently operated and managed, and a new energy service may be provided through analysis of big data including meter reading information and meter installation environment information.

The technical concept of the disclosure may be applied to a computer-readable recording medium which records a computer program for performing the functions of the apparatus and the method according to the present embodiments. In addition, the technical idea according to various embodiments of the disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the disclosure have been illustrated and described, the disclosure is not limited to the above-described specific embodiments. Various changes can be made by a person skilled in the art without departing from the scope of the disclosure claimed in claims, and also, changed embodiments should not be understood as being separate from the technical idea or prospect of the disclosure.

The invention claimed is:

1. A method for managing advanced metering infrastructure (AMI) meters, the method comprising:
   Collecting energy usage data received from the advanced metering infrastructure (AMI) meters and storing the collected energy usage data to a meter data platform;
   Collecting environmental data of the meters and storing the collected environmental data to the meter data platform;
   predicting states of the meters, based on the collected environmental data by a big data analysis system,
   wherein the environmental data comprises information regarding a collected number of communication attempts to transmit the energy usage data, and
   wherein the predicting of the states of the meters comprises battery states of the meters,
   wherein the predicting further comprises identifying a hard-to-read region, based on the collected number of communication attempts; and
   the predicting that a battery available time of the battery states of the meters located in the hard-to-read region is shorter than the battery available time of the battery states of the meters located in other regions,
   and
   analyzing a cause of difficulty in reading the battery available time of the battery states of the meters in the hard-to-read region,
   wherein the analyzing whether the difficulty in said reading the battery available time of the battery states of the meters in the hard-to-read region is caused by communication competition and collision, and by concentration of the AMI meters or a problem in a communication network to reduce battery consumption of the AMI meters located in the hard-to-read region, thereby increasing a remaining battery lifespan.

2. The method of claim 1, wherein the energy usage data and the environmental data are collected all together through a single meter data packet.

3. The method of claim 1, further comprising controlling a meter reading interval and a communication interval of a meter of the AMI meters, based on a temperature.

4. The method of claim 1, wherein the environmental data comprises an installation position and a height of each of the meters, and the collected number of communication attempts,
   wherein the method further comprises analyzing a communication environment depending on the height of said each of the meters by regions.

5. A system for managing advanced metering infrastructure (AMI) meters, the system comprising:
   a data platform configured to collect energy usage data from the meters, and to collect environmental data of the meters; and
   an analysis system configured to predict states of the meters, based on the environmental data collected in the data platform,
   wherein the environmental data comprises information regarding a collected number of communication attempts to transmit the energy usage data, and
   wherein the predicting of the states of the meters comprises battery states of the meters,
   wherein the predicting comprises identifying a hard-to-read region, based on the collected number of communication attempts; and
   the predicting that a battery available time of the battery states of the meters located in the hard-to-read region is shorter than the battery available time of the battery states of the meters located in other regions,
   wherein the environmental data comprises information regarding the collected number of communication attempts to transmit the energy usage data, and
   analyzing a cause of difficulty in reading the battery available time of the battery states of the meters in the hard-to-read region,
   wherein the analyzing whether the difficulty in said reading the battery available time of the battery states of the meters in the hard-to-read region is caused by communication competition and collision, and by concentration of the AMI meters or a problem in a communication network to reduce battery consumption of the AMI meters located in the hard-to-read region, thereby increasing a remaining battery lifespan.

6. A method for managing advanced metering infrastructure (AMI) meters, the method comprising:
   Collecting energy usage data received from the advanced metering infrastructure (AMI) meters and storing the collected energy usage data to a meter data platform;
   Collecting environmental data of the meters and storing the collected environmental data to the meter data platform;
   predicting states of the meters, by a big data analysis system, based on the collected environmental data,
   controlling the meters based on the predicted states of the meters,
   wherein the environmental data comprises information regarding a collected number of communication attempts to transmit the energy usage data, and
   wherein the predicting of the states of the meters comprises battery states of the meters,
   wherein the predicting further comprises identifying a hard-to-read region, based on the collected number of communication attempts; and
   the predicting that a battery available time of the battery states of the meters located in the hard-to-read region is shorter than the battery available time of the battery states of the meters located in other regions, and
   analyzing a cause of difficulty in reading the battery available time of the battery states of the meters in the hard-to-read region,
   wherein the analyzing whether the difficulty in said reading the battery available time of the battery states of the meters in the hard-to-read region is caused by communication competition and collision, and by concentration of the AMI meters or a problem in a communication network to reduce battery consumption of the AMI meters located in the hard-to-read region, thereby increasing a remaining battery lifespan.

7. A system for managing advanced metering infrastructure (AMI) meters, the system comprising:
   a meter data platform configured to collect energy usage data from the meters, and to collect environmental data received from the advanced metering infrastructure (AMI) meters and to store the collected energy usage data and the collected environmental data to the meter data platform; and
   an analysis system configured to predict states of the meters, based on the environmental data collected in the meter data platform, and to control the meters based on the predicted states of the meters;
   wherein the environmental data comprises information regarding a collected number of communication attempts to transmit the energy usage data, and
   wherein the predicted states of the meters comprises battery states of the meters,
   wherein the predicted states of the meters comprises identifying a hard-to-read region, based on the collected number of communication attempts; and
   a big data analysis system configured to predict a battery available time of the battery states of the AMI meters located in the hard-to-read region is shorter than the battery available time of the battery states of the meters located in other regions, to control the AMI meters located in the hard-to-read region to have a long communication interval for reducing battery consumption of the AMI meters located in the hard-to-read region and increasing a remaining battery lifespan,
   wherein the big data analysis system analyzes a cause of difficulty in reading the battery states of the meters in the hard-to-read region whether the difficulty in said reading the battery states of the meters in the hard-to-read region is caused by communication competition and collision, and by concentration of the AMI meters or a problem in a communication network, to reduce the battery consumption of the AMI meters located in the hard-to-read region, thereby said increasing the remaining battery lifespan.

* * * * *